United States Patent [19]
Richards et al.

[11] 4,073,997
[45] Feb. 14, 1978

[54] COMPOSITE PANEL

[75] Inventors: David O. Richards, Newark; Isaac P. Jones, Granville; Homer W. Duffee, Newark; Charles E. Nutter, Hebron, all of Ohio

[73] Assignee: Owens-Corning Fiberglas Corporation, Toledo, Ohio

[21] Appl. No.: 724,129

[22] Filed: Sept. 17, 1976

Related U.S. Application Data

[60] Continuation of Ser. No. 530,110, Dec. 6, 1974, abandoned, which is a division of Ser. No. 263,746, June 9, 1972, Pat. No. 3,874,980.

[51] Int. Cl.² .............................................. B32B 17/10
[52] U.S. Cl. ................................. 428/285; 52/309.4; 156/71; 52/309.9; 156/78; 156/79; 428/313; 428/321; 428/322; 428/339; 428/90 G
[58] Field of Search ................ 156/71, 78, 79; 52/58, 52/96, 273, 309, 746, 408, 309.4, 309.6, 309.9; 428/141, 143, 285, 286, 311, 313, 317, 321, 322, 906, 339

[56] References Cited
U.S. PATENT DOCUMENTS 3,483,664  12/1969  Funk et al. ............................. 52/309
3,672,951  6/1972   Moore et al. ......................... 428/322
3,726,754  4/1973   Coglianese et al. .................. 156/71
3,833,454  9/1974   Ambrose ............................. 297/458
3,892,899  7/1975   Klein .................................... 428/49

Primary Examiner—George F. Lesmes
Assistant Examiner—Stanley S. Silverman
Attorney, Agent, or Firm—John W. Overman; Allen D. Gutchess, Jr.; Charles F. Schroeder

[57] ABSTRACT

A composite panel is provided which comprises an organic foam core with layers of inorganic fibers on opposite major surfaces of the core. The fibrous layers are affixed to the core in a manner such that they are functionally integral therewith, thereby providing dimensional stability for the core. In a preferred embodiment, the panel is embodied in roof insulation which consists of a core of organic foam with a mat of inorganic fibers located on an upper surface of the foam core and a layer of inorganic fibers located on a lower surface of the core. The lower surface of the insulation is affixed to an underlying roof structure by a layer of adhesive and specifically asphalt. Alternate layers of asphalt and fibrous mats are applied over the upper mat of the inorganic fibers to complete the roof insulation system.

13 Claims, 5 Drawing Figures

COMPOSITE PANEL

This is a continuation of application Ser. No. 530,110, filed Dec. 6, 1974, now abandoned, which is a division of application Ser. No. 263,746, filed June 9, 1972, now U.S. Pat. No. 3,874,980.

This invention relates to a composite panel having an organic foam core with inorganic fibrous layers on opposite major surfaces of the core, and more particularly to roof insulation embodying a composite panel comprising an organic foam core with a mat of inorganic fibers on an upper surface thereof and a layer of inorganic fibers on a lower surface thereof.

Increasing emphasis is being placed on high insulating values in roof insulation, particularly as fuel reserves become more critical, the higher insulating values correspondingly reducing heat losses and fuel requirements. A number of insulating materials have heretofore been used for roof insulation and most of such materials can achieve desired increased insulating characteristics by being employed in sufficiently thick form. However, most such material cannot be produced in sufficient thickness in a single layer with commercial apparatus presently used to make the material. Consequently, two or more layers of the material must be produced separately and then assembled, which increases costs not only because of the relatively large amount of material but because of the additional assembly step required.

Many closed-cell organic or plastic foams, particularly polyurethanes, have excellent insulating properties. However, such foams are commonly lacking in dimensional stability, growing excessively when subjected to high heat and humidity in aging tests, for example. Such foams also are strongly affected by heat and will warp when subjected to non-uniform temperatures. Such characteristics have rendered these organic foams less than suitable for roof insulation, particularly when placed on layers of hot asphalt applied on an underlying roof structure and when hot asphalt is applied over the foam.

It has been discovered that by employing layers of inorganic fibers on both major surfaces of a foam core or slab, the above difficulties can be overcome. Specifically, the changes in dimensions of the foam in aging tests are reduced to a small percentage of the former changes encountered. Further, slabs of the organic foam will not be affected to any degree by heat and will not warp when subjected to hot asphalt applied on one of the surfaces thereof. The inorganic fibers employed are preferably glass fibers, having high strength and a high modulus of elasticity, and at least one of the layers of fibers preferably is in the form of an unwoven mat, being randomly disposed in a plane parallel to the core. However, other types of fibrous layers, particularly thicker boards of the fibers and also fibers in woven form, can be employed. Whatever the nature of the layers, however, they should be functionally integral with the foam to prevent any slipping or relative movement between the layers and the foam, in order to achieve dimensional stability and heat resistance.

An effective method of achieving the structural integrity is to place the fibrous layers in contact with the foam forming the core during foaming so that the foam will tend to penetrate interstices in the fibrous layers to form an interlocking inter-face therebetween. For this purpose, a suitable organic foam mixture can be applied to one of the fibrous layers with the other fibrous layers then placed on the foaming mixture and backed up or supported so that it will not be able to move completely freely outwardly from the first fibrous layer as the mixture foams. This achieves penetration by the foam into both layers. The inorganic facings restrain dimensional changes in the foam when subjected to changes in temperature and moisture. This substantially reduces warping and cell rupture of the foam.

More specifically, the first fibrous layer can be moved in a flat, supporting position on a belt-type conveyor above which is suitable mixing apparatus and a nozzle, the nozzle evenly distributing the foam mixture onto the first fibrous layer. The second fibrous layer is then directed onto the foam mixture, preferably after the foaming has commenced. A second belt-type conveyor is then disposed above a portion of the first conveyor a predetermined distance, with the second conveyor backing up and restricting upward movement of the second fibrous layer as foaming of the mixture moves the second layer upwardly. A composite panel thereby results consisting of the organic foam core of slab and the two fibrous layers located in substantially parallel relationship, with this panel being cut or shaped to any desired size and predetermined configuration.

Specifically for use in roof insulation, a polyurethane foam slab is employed having a mat of glass fibers on the upper surface thereof and a layer of glass fibers on the lower surface. The lower layer can be in the form of a board of glass fibers or a mat of them, similar to the mat on the upper surface of the slab. Whether the bottom surface is a thicker board or a thinner mat depends primarily on the nature of the underlying roof structure and whether or not the roof insulation must be fire retardant or resistant. In either case, the core with the inorganic fibrous layers on the surfaces produces a balanced system which has many advantages over insulating structures heretofore known, particularly in achieving dimensional stability with reduction in warping and cell rupture of the foam.

In producing the roof insulation system, a layer of hot, molten asphalt is first applied to the underlying roof structure or roof deck with the foam slab and glass fiber layers on the surfaces thereof then placed as composite panels on the hot asphalt. Such asphalt may be applied at a temperature of 350° F. or higher and would cause the foam slab, if used alone, to warp upwardly. After the composite panels are in place, glass fiber tape is frequently applied to the joints of the insulation, on the upper mats of the glass fibers. A layer of asphalt again is applied to this upper surface with this layer attacking the foam if used without the upper fibrous mat. Another fibrous mat is then applied to the upper asphalt layer with additional layers of asphalt and fibrous mats further applied, as desired. The upper layer is either a final layer of asphalt with or without gravel applied thereon or a layer of fiber mat with granules embedded in the upper surface. The fibrous mat affixed to the upper surface of the foam core constitutes, in effect, one of the required layers of fibrous mat on top of the insulation so that one less additional fibrous mat is required than heretofore needed. Consequently, the mat and an additional asphalt layer, with the corresponding labor, are eliminated.

It is, therefore, a principal object of the invention to provide an organic foam composite with good dimensional stability.

Another object of the invention is to provide a foam composite panel which as good resistance to heat and high humidity and exhibits minimum warping from exposure to nonuniform temperatures.

A further object of the invention is to provide composite roof insulation excelling in insulation properties.

Still another object of the invention is to provide roof insulation comprising an organic foam slab exhibiting high dimensional stability and warp resistance to nonuniform application of heat.

Still a further object of the invention is to provide roof insulation comprising an organic foam core with layers of inorganic fibers on major opposite surfaces thereof.

An additional object of the invention is to provide an inorganic, non-combustible insulating layer between a heatconducting roof deck and an organic foam layer to prevent destruction of the foam in case of fire.

Yet another object of the invention is to provide a building panel comprising an organic foam slab with layers of inorganic fibers functionally integral with opposite major surfaces of the slab.

Other objects and advantages of the invention will be apparent from the following detailed description of preferred embodiments thereof, reference being made to the accompanying drawings, in which.

Figure 1:
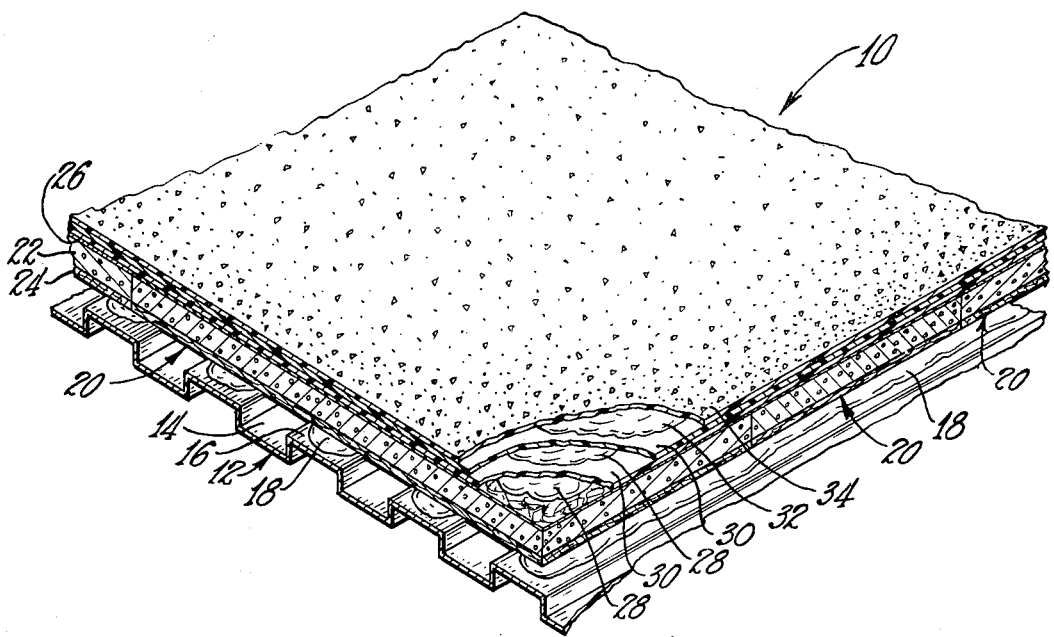
FIG. 1 is an overall view in perspective, with parts broken away, of a roof insulation system according to the invention.

Referring to FIG. 1, a roof insulation system indicated at 10 according to the invention is shown on an underlying structural roof and specifically a steel roof deck 12. The steel roof deck 12 is of a type known in the art and include troughs 14 and lands or ridges 16 on which are applied layers 18 of asphalt. Roof insulation 20 according to the invention, usually being two, three, or four feet wide and four feet long, is applied directly on the asphalt layers 18. The insulation can be cut up to four by twelve feet, however, depending on the packaging, shipping, and site handling capabilities. The insulation 20 includes an organic foam core or slab 22 preferably of polyurethane foam with a layer 24 of inorganic fibers, preferably glass fibers, on a lower major surface of the core and a layer 26 of inorganic fibers, preferably glass fibers, on an upper major surface of the core. This composite provides a balanced system of an organic foam core with layers of inorganic fibers functionally integral with both major surfaces thereof.

With the insulation 20 in place on the deck 12, and the seams taped, if desired, another layer 28 of hot asphalt is subsequently applied over the upper fibrous mat 26. A layer 30 of asphalt-impregnated fibrous mat is then applied on the still hot layer 28 of asphalt. If desired, the layers 28 and 30 can be repeated, as shown. A final layer 32 of asphalt is then applied on the upper mat 30 and a final upper layer of asphalt-impregnated mat 34 is applied on the hot asphalt layer 32. The mat 34 can have suitable granules imbedded in the upper, exposed surface thereof. Alternately, asphalt and then gravel can be applied for the final exposed surface or a layer of asphalt alone is sometimes used. The various mats 30 and 34 are applied in overlapping strips from rolls as is well known in the art.

The insulation 20 must be applied to the asphalt layers 18 when the asphalt is still at a substantially elevated temperature, being mopped onto the roof at a temperature often in excess of 350° F. Heretofore, if organic foam slabs were applied directly on the hot asphalt, they would tend to warp upwardly due to the heated lower surface and the relatively cool upper surface. Consequently, after the foam slabs were applied and prior to the asphalt hardening fully, the foam slabs would have to be forced downwardly into contact with the asphalt again, requiring additional labor. Further, with hot asphalt mopped directly on the upper surfaces of the plastic foam slabs, damage to the foam would often occur, caused by a breakdown in the foam cells of the slabs, resulting in loss of Freon and reduction in insulating properties of the foam.

The layers 24 and 26 of inorganic fibers overcome the above disadvantages and provide other advantages for the insulation 20. In particular, the two layers provide substantial dimensional stability for the core 22 which cannot otherwise be obtained. For example, in a humid aging test, the product is subjected to a temperature of 158° F. at a relative humidity of 95–100% for a period of 28 days. With a slab of urethane foam used alone in these tests, the slab grows longitudinally and transversely in an amount from 10 to 15 percent. However, with the functionally integral inorganic fibrous layers 24 and 26 employed, the rate of growth is reduced to less than two percent and usually less than 0.5 percent. Further, with the two layers of fibers on the slab, the slab or composite wall not warp when layed directly on the hot asphalt layers 18. Consequently, once the composite slab has been applied to the asphalt, it will adhere thereto and no additional steps are required to re-adhere the slab, as required when it is warped. The upper layer 26 also aids in retaining the structural integrity of the foam with the result that the foam is not damaged when the hot asphalt is mopped directly on the layer 26. Further, the thick layer 24 of inorganic fibers provides fire resistance for the insulation 20 which cannot otherwise be achieved, with the layer 24 also contributing significantly to the insulating effect of the overall composite insulation 20. This is particularly important for most organic foams which tend to have high insulating ratings but low resistance to fire and heat. Hence, the thick layer of board 24 provides both fire resistance and insulation with the combined fibrous layers 24 and 26 and the foam 22 readily achieving C values of 0.03–0.20 for the insulation 20, for example.

By way of example, the thickness of the foam core 22 can vary from one-half inch to four inches, depending upon the degree of insulation required and the core will have a density from 1.4 to 2.6 pcf., preferably about 1.8 to about 2.2 pcf. In a specific instance, the plastic foam core 22 can be a urethane which is preferred because it combines excellent thermal properties with better than average fire resistance for organic foams and lower cost. A specific example of a urethane foam suitable for the particular purpose is as follows:

100 parts polyol with a hydroxyl number of 420;
100 parts polymeric isocyanate;
25 parts Freon F-11B;
0.5 part amine catalyst; and
0.5 part cell controller.

All of the above except the polymeric isocyanate are mixed together and this mixture then mixed with the polymeric isocyanate. A liquid results which can then be applied directly onto the fibrous layer 24 with the fibrous layer 26 then applied thereover. Heat of reaction in the mixture causes the Freon to vaporize and cause forming, with some of the foam partly penetrating the interstices of the fibrous layers 24 and 26.

By way of further example, an isocyanurate foam which can be utilized in the invention comprises:
100 parts polymeric isocyanate;
20 parts Freon F-11B;
10 parts isocyanurate-producing catalyst;
0.5 part cell controller; and
20.0 parts polyol.

All but the polymeric isocyanate are mixed together and these are then mixed with the isocyanate and applied to the desired fibrous layer in the same general manner as with the urethane foam.

While urethane foam is particularly suitable for use in the invention, other cellular expanded polymeric materials can be employed, the cellular materials preferably having closed cells in the order of 90-95% closed to achieve the desired insulating properties. Such foam materials include Styrofoam, epoxies, phenolics, urethanes, isocyanurates, polyvinyl chlorides, and mixtures of these.

The layer 24 of the inorganic fibers specifically can be a fibrous board having a thickness from one-half to two and one-half inches and an apparent density of six to twelve pcf and preferably about nine pcf. The board consists of glass fibers having diameters ranging from 0.00050 to 0.00055 inch although they can be as fine as 0.00010 inch. The fibers are held by a thermosetting binder and specifically a modified phenolic resin binder present in an amount from about six to twelve percent by weight and preferably about 8-10 percent. The glass fibers in the board can be made by a rotary process to be discussed below, such a product being known as an AF board.

The upper layer or mat 26 comprises glass fibers or filaments having diameters in the order of 0.00045 to 0.00055 inch bonded by a modified phenolic resin in an amount of 15-25% by weight. The mat has a weight from about one to about two and a half pounds per hundred square feet. Preferably, the fibers or filaments are attenuated in a number of small groups of fine strands from bushings and are deposited on a conveyor belt, after which they are subjected to a liquid treatment which further disperses the filaments in the strands, thus placing the fibers of the mat in dispersed filamentary form. This process is shown in a co-pending U.S. application of Richard E. Pitt, Ser. No. 869,951, filed on Oct. 27, 1969, now abandoned. The uniform dispersal of the filaments in the strands provides an excellent mat for use with the foam since it enables sufficient penetration of the mat by the foam to provide functional integrity, but not an excessive amount of penetration which would waste the foam material and add weight to the roof insulation product.

Figure 3:
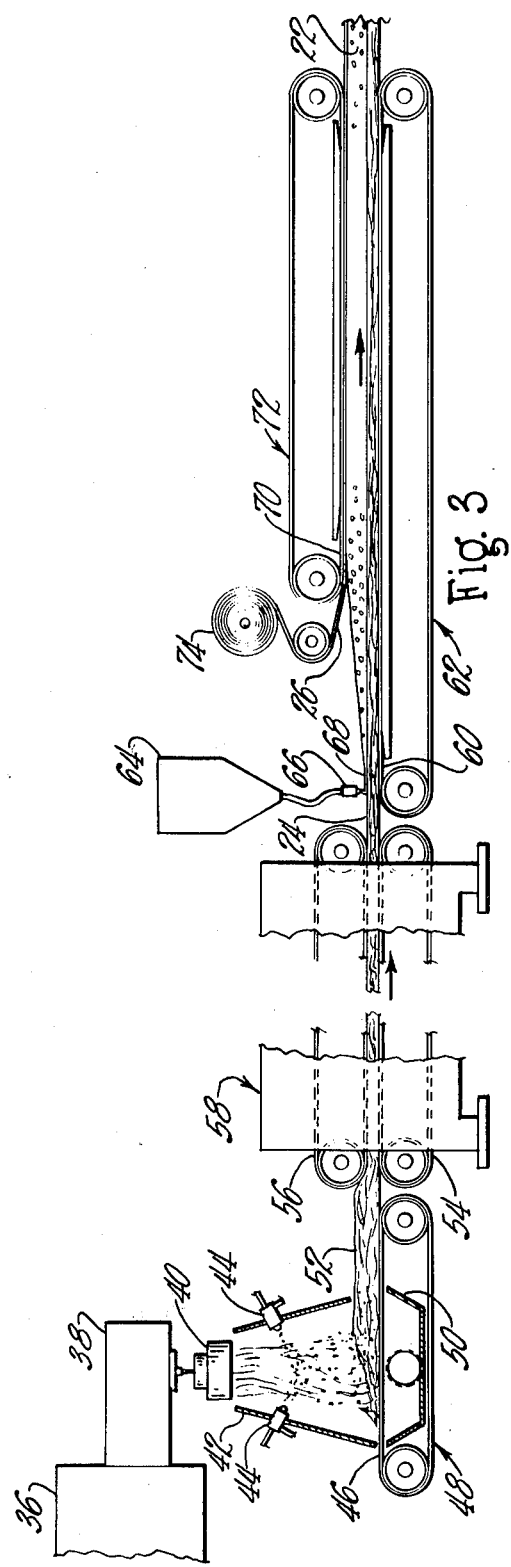
FIG. 3 is a schematic, framgentary, side view in elevation of a production line for producing the roof insulation of FIG. 2.

A production line for producing the roof insulation 20 is schematically shown in FIG. 3, the fibrous layer or board being made on the first portion of the line. Accordingly, a glass is melted in a tank 36 and supplied through a forehearth 38 to a rotary fiber-forming unit 40. Fibers formed by the unit 40 move downwardly through a forming hood 42, being sprayed by binder issuing from spray devices 44. The fibers are then deposited on a belt 46 of a conveyor 48 with the aid of a vacuum chamber 50 located below the upper run of the belt 46.

The fibers with the binder thereon form a layer 52 on the belt 46 and move toward the right as viewed in FIG. 3. The layer 52 is then carried between two conveyor belts 54 and 56 which have adjacent runs spaced apart a predetermined distance to compress and densify the fiber layer 52 and establish smooth, parallel major surfaces thereon. The conveyor belts 54 and 56 can be located in an oven 58 in which the binder on the fibers is cured. The formed layer or board 24 emerges from the oven 58 and is carried further toward the right on a belt 60 of an additional conveyor 62. The density on the fibrous board can be controlled by the speed of the conveyor 48 as well as by the distance between the belts 54 and 56. To this point, the production line is basically similar to lines known in the art for producing fibrous board, and specifically those known as AF board.

The ingredients for the foam 22 are supplied and mixed by suitable apparatus indicated at 64 and supplied through a distributor nozzle 66 which is located above the upper run of the belt 60 and above the fibrous board 24. The nozzle is oscillated transversely across the board 24 on the belt 60 and deposits a relatively thin layer 68 of foamable mixture thereon. As the board 24 and the mixture 68 move along the conveyor, the mixture begins to foam in a relatively short time. A belt 70 of a backup conveyor 72 is disposed a predetermined distance above the upper run 60 of the conveyor 62 with the distance between the adjacent runs of the belts being less than the combined thickness of the fibrous layer 24 and the foam which would otherwise result if the mixture 68 were allowed to foam unrestrictedly. The fibrous mat 26 for the upper surface of the roof insulation 20 is supplied from a suitable roll 74 to a position immediately under the lower run of the belt 70. As the foam mixture depends upwardly, it comes into contact with the mat 26, forcing it against the belt 70 and causing the mat 26 to assume a smooth, substantially planar layer on the upper correspondingly-planar surface of the foam 22 emerging between the belts 60 and 70.

With this process, the foam is securely interlocked or functionally integral with the fibrous layers on the major surfaces thereof. Accordingly, the foam mixture, in a liquid state, penetrates the upper surface of the fibrous board 24 when distributed thereon flowing slightly into the interstices of the board. Similarly, the upper surface of the foam penetrates the mat 26 as the foam presses the mat upwardly against the belt 70 and penetrates the interstices of the mat. The degree of penetration of the foam into the fibrous layers can be controlled by a number of factors including the specific composition of the foamable mixture, the size of the fibers in and the density of the layer 24, the size and distribution of the fibers in the mat 26, the chemical nature of the binders in both the fiber layers 24 and 26, the viscosity of the foamable mixture, and by the "cream" time required for the foamable mixture to foam. Ambient temperature and temperatures of the foam and particularly the fibrous layers also will influence foaming and the extent of penetration.

Figure 4:
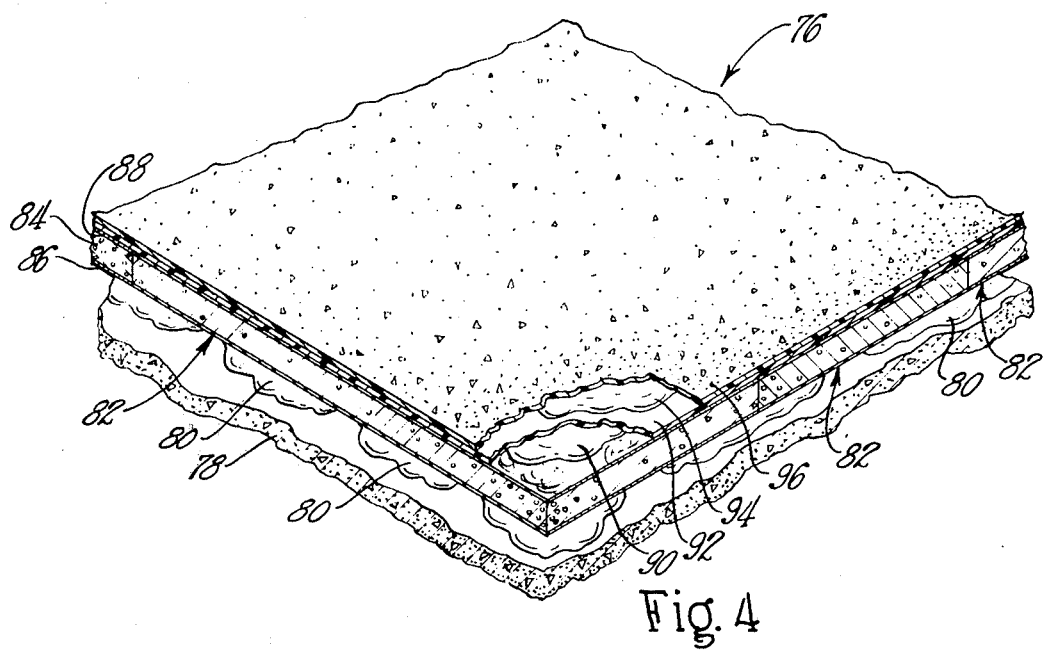
FIG. 4 is a view in perspective similar to FIG. 1 of a modified roof insulation system embodying the invention.
Figure 5:
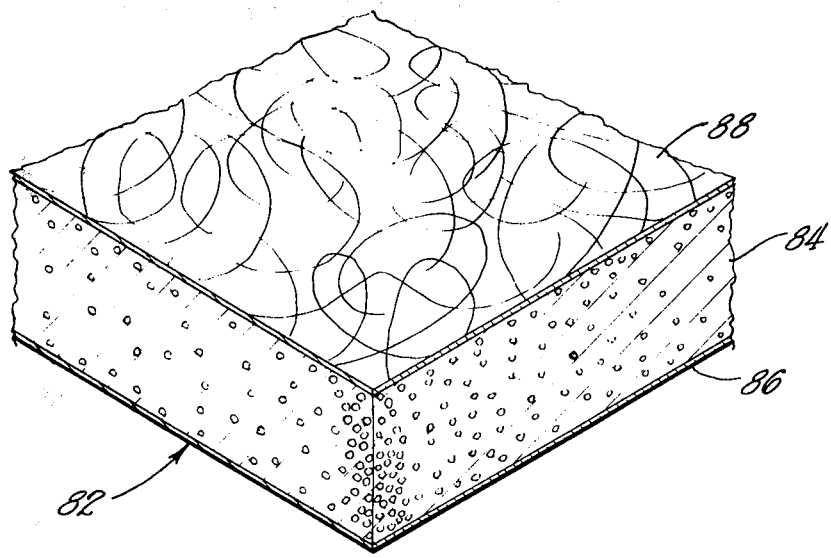
FIG. 5 is a view in perspective similar to FIG. 2 of the roof insulation of FIG. 4 alone.

Referring now to FIGS. 4 and 5, a roof insulation system indicated at 76 is basically similar to the roof insulation 10 but is designed for an underlying roof structure which is incombustible, and specifically such structures which employ concrete or gypsum decks. In such instances, fire resistance is not an important factor. Consequently, the lower fibrous layer can be much thinner than the fibrous board 24 and the urethane foam can be present in amount to provide a "C" value in the order of 0.05 for the insulation. A concrete roof deck 78 is shown as flat or unbroken and having a layer 80 of asphalt thereon. Roof insulation according to the invention indicated at 82 is applied on the layer 80 while still hot and in soft condition. The insulation 82 includes an organic foam core or slab 84 with a layer or mat 86 of inorganic fibers, preferably glass fibers, on a lower major surface of the core and a layer of mat 88 of inorganic fibers, preferably glass fibers on an upper major surface of the core. Again, this composite provides a balanced system of an organic foam core with layers of inorganic fibers functionally integral with both major surfaces thereof.

Figure 2:
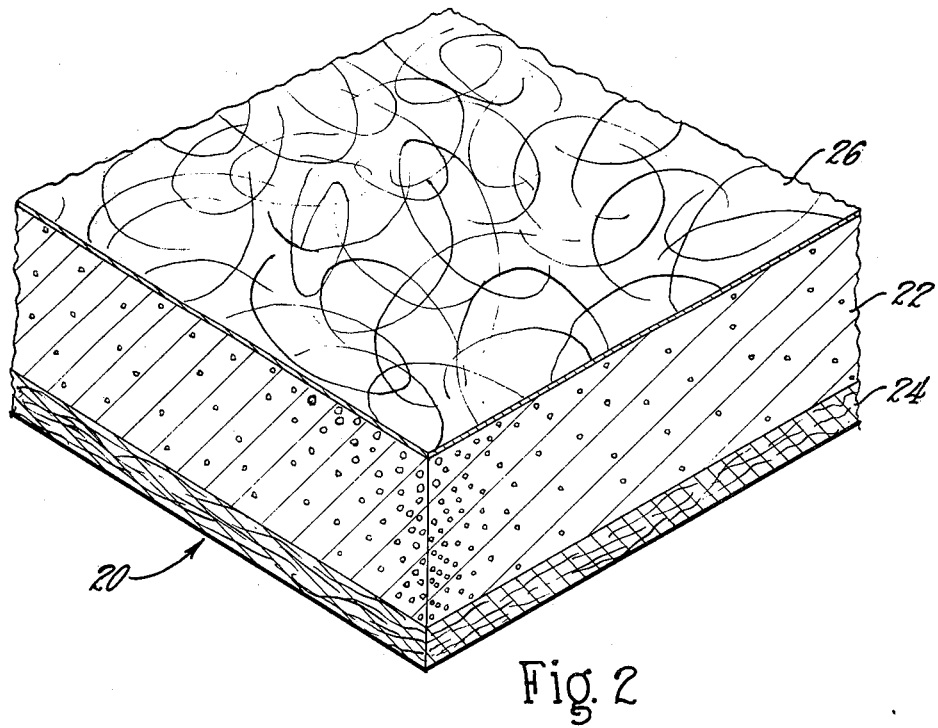
FIG. 2 is a view similar to FIG. 1 but on an enlarged scale, of the roof insulation alone.

With the insulation 82 on the deck 78, another layer 90 of asphalt can be applied to the mat 88 with a layer 92 of asphalt-impregnated fibrous mat then applied on the hot asphalt layer 90. Again, if desired, an additional layer 94 of asphalt and a final mat 96 can be employed, with the final exposed surface finished in the same manner as the roof system 10 of FIGS. 1 and 2. The upper mat 88 reduces the number of the impregnated mats 92 and 96 required since it usually serves as a substitution for one of such mats. The foam core 84 can be substantially the same as the core 22 with the fibrous matt 88 similar to the mat 26. In this instance, the lower mat or layer 86 is substantially similar to the mat 88 on the upper surface.

The thin mats 86 and 88 provide substantially most of the same advantages for the roof insulation 82 as the layers 24 and 26 provide for the roof insulation 20. These include, in particular, dimensional stability under hot and humid conditions, resistance to non-uniform application of heat or non-uniform subjection to elevated temperatures, and lack of warping when subjected to the hot asphalt as well as structural resistance when the hot asphalt is mopped thereon. The inorganic facings also substantially reduce cell breakage and loss of insulating properties of the organic foam, due to the heat when the asphalt is applied and due to the dimensional changes in the foam, whether occurring when the asphalt is applied or over a period of time due to temperature and humidity variations.

The insulation 82, while being substantially lower in fire resistance, will provide a higher insulating value for the overall insulation if the insulation is of the same thickness as the insulation 20. This occurs because a greater proportion of the insulation 82 is made up of the organic foam which has a somewhat higher insulating value than the fibrous board 24.

The foam and fibrous layers can be produced with apparatus similar to the end portion of the line of FIG. 3. In this instance, the lower mat 86 can be moved along a conveyor with the foamable mixture applied thereto and with the mat 88 applied thereover, with the composite moving between two spaced, parallel conveyors to provide some compression on the foam and assure some penetration of the foam into interstices in the two mats 86 and 88.

Various modifications of the above described embodiments of the invention will be apparent to those skilled in the art and it is to be understood that such modifications can be made without departing from the scope of the invention, if they are within the spirit and the tenor of the accompanying claims.

We claim:
1. A roof insulating system comprising a roof deck; an adhesive layer on said roof deck; roof insulation on said layer, said roof insulation comprising a slab of expanded organic polymeric material having two major, substantially planar, substantially parallel surfaces and a peripheral edge of predetermined shape, said slab having a thickness from about one-half inch to about four inches, a thin mat of substantially randomly-disposed glass fibers on the upper major surface of said slab with the mat disposed substantially uniformly over said entire major surface, said fibers being held together by a binder, the polymeric material at the upper edge of said slab at least partially penetrating interstices among the fibers of said mat in a manner to be functionally integral therewith, and a layer of glass fibers affixed to the lower major surface of said slab, the polymeric material at the lower surface of said slab at least partially penetrating interstices among the fibers of the latter layer in a manner to be functionally integral therewith; a second adhesive layer on the upper surface of said mat; and a mat of fibers impregnated with asphalt on top of said second layer.

2. A system according to claim 1 characterized by said roof insulation having a "C" value between 0.03 and 0.20.

3. A system according to claim 1 characterized by said roof deck being made of an incombustible material, and said layer of glass fibers comprises a thin mat of substantially randomly disposed glass fibers.

4. A system according to claim 3 characterized by the fibers of said mat being glass fibers dispersed in filamentary form.

5. A system according to claim 1 characterized by said roof deck being made of a material having a high ratio of heat conductivity or low fire resistance, and said layer of glass fibers comprises a preformed board of glass fibers.

6. A system according to claim 5 characterized by said board having a thickness from about ½ to about 2½ inches and an apparent density from about six to about twelve pcf.

7. A system according to claim 6 characterized by said board having a phenolic resin binder present in an amount from about 6 to about 12 percent, by weight.

8. A roof insulating system comprising a roof deck; an adhesive layer on said roof deck; roof insulation on said layer, said roof insulation comprising a slab of expanded organic polymeric material having two major, substantially planar, substantially parallel surfaces, a thin mat of substantially randomly-disposed glass fibers on the upper major surface of said slab with the mat disposed substantially uniformly over the entire upper major surface, said fibers being held together by a binder, and a layer of glass fibers on the lower major surface of said slab; a second adhesive layer on the upper surface of said mat; and a mat of fibers and asphalt on top of said second adhesive layer.

9. A roof insulating system according to claim 8 characterized by said slab having a thickness from about one-half inch to about four inches, the polymeric material at the upper surface of said slab at least partially penetrating interstices among the fibers of said thin mat in a manner to be functionally integral therewith, and the polymeric material at the lower surface of said slab at least partially penetrating interstices among the fibers of said layer of glass fibers in a manner to be functionally integral therewith.

10. A roof insulating system according to claim 8 characterized by said roof insulation having a "C" value between 0.03 and 0.20.

11. A roof insulating system according to claim 8 characterized by said layer of glass fibers comprises a preformed board of glass fibers.

12. A roof insulating system according to claim 8 characterized by said roof deck being made of an incombustible material, and said layer of glass fibers comprises a thin mat of substantially randomly-disposed glass fibers.

13. A system according to claim 8 characterized by the glass fibers of said mat being dispersed in filamentary form.

* * * * *